United States Patent Office 3,300,452
Patented Jan. 24, 1967

3,300,452
THERMOSETTING ETHYLENE COPOLYMERS
George E. Waples, Jr., Lake Jackson, Tex., assignor to The Dow Chemical Company, Midland, Mich., a corporation of Delaware
No Drawing. Filed Nov. 6, 1963, Ser. No 321,684
7 Claims. (Cl. 260—86.7)

This invention pertains to thermosetting copolymers of ethylene with polymerizable hydroxyl-containing esters. More particularly it pertains to copolymers of ethylene with β-hydroxyalkyl esters of α,β-ethylenically unsaturated acids.

In the past decade, the utilization of polyethylene and certain ethylene copolymers has grown greatly because of the recognized good properties and economy of the materials. There are certain disadvantages, nevertheless, of such products such as in applications where resistance to temperatures significantly higher than room temperature is desired. For example, shaped articles prepared from many of the ordinary polymers and copolymers of ethylene become misshapen at temperatures below that of boiling water. Further, the strength of fabricated articles such as pipe made from polymers and usual copolymers of ethylene is reduced greatly as the temperature is increased from 60° F., for example, to 120° F. Thus, improvements in resistance to temperatures significantly above room temperature would add considerably to the range of usefulness of ethylene products.

It is an object of this invention to provide new compositions useful in the plastics art. It is a further object to provide polymeric compositions which have increased resistance to deterioration in properties from temperatures higher than room temperature, especially temperatures above about 40° C. It is a still further object to provide polymeric materials which are thermosetting. A more specific object is to provide new copolymers comprising ethylene which are thermosettable.

These and other objects are attained in a copolymer of ethylene and a β-hydroxyalkyl ester of an α,β-ethylenically unsaturated carboxylic acid. When such copolymers are heated to a temperature from about 170° C. to about 340° C. their thermoplasticity is reduced, their tensile strength is increased, and their apparent molecular weight is increased. When the melt indexes of the copolymer before and after such treatment are compared it is found that the treatment has reduced the melt index, i.e. the apparent molecular weight has increased. Some degree of cross-linking or thermosetting has evidently taken place. When the copolymers of this invention are heated for 30 minutes at temperatures above about 340° C., the degree of thermosetting becomes so great that extrusion becomes extremely difficult, or even impossible. Further relationships are found from a modified melt index of the materials. By "modified melt index" is meant that the standard melt index conditions have been modified to the extent that different temperatures are used. Thus "melt index" refers to the value obtained, according to the definition in ASTM D–1238–57–T; "modified melt index" refers to values obtained in the same manner except at other temperatures. Whereas conventional polymers and copolymers of ethylene have increased modified melt indexes as the temperature is increased, the copolymers of this invention exhibit decreased modified melt indexes as the temperature is increased.

The advantageous copolymers of this invention comprise a copolymer of from about 65 percent to about 99 percent by weight of ethylene and from about 1 percent to about 35 percent by weight of a β-hydroxyalkyl ester of an α,β-ethylenically unsaturated acid having the formula

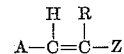

wherein R is selected from the group consisting of hydrogen and methyl; Z is

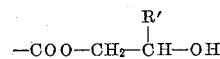

wherein R' is selected from the group consisting of hydrogen, a hydrocarbon radical and a halogen-substituted hydrocarbon radical; and A is selected from the group consisting of hydrogen, Z, and —COO—CH₂—R' wherein Z and R' are as defined supra. In the usual practice of the invention, R' includes radicals such as hydrogen and organic radicals having up to 8 carbon atoms but radicals containing a greater number of carbon atoms may be used if desired. Thus, in addition to hydrogen, R' consists of hydrocarbon radicals such as methyl, ethyl, propyl, butyl, 2-ethylhexyl, cyclohexyl, phenyl, tolyl, ethylphenyl, and similar radicals having one or more halogen substituents, especially chlorine. The term "β-hydroxyalkyl" whenever used in this specification in reference to β-hydroxyalkyl esters is intended to mean the radical

wherein R' is defined above.

The β-hydroxyalkyl esters of α,β-ethylenically unsaturated acids include β-hydroxyalkyl esters of monocarboxylic and dicarboxylic acids such as acrylic acid, α-substituted acrylic acids, (especially methacrylic acid), maleic acid, and fumaric acid.

Such β-hydroxyalkyl esters may be prepared from the unsaturated acids defined above and a glycol having hydroxyl groups on adjacent carbon atoms, e.g. ethylene glycol, 1,2-propanediol, 1,2-butanediol and styrene glycol. However, such esters need not be prepared directly from the corresponding glycols. For example they may be prepared from an α,β-ethylenically unsaturated acid as defined above and epoxides, e.g. ethylene oxide, propylene oxide, and styrene oxide by known methods such as those shown in U.S. Lettters Patent 2,929,835 or in British Patent 871,767. When the acid component of the ester is a dicarboxylic acid such as maleic acid or fumaric acid, the ester may be a common diester or a mixed diester; i.e., in the formula

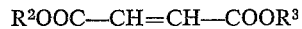

R² and R³ may be the same or different but at least one of R² and R³ must have a hydroxyl group on the β-carbon atom. Such mixed esters of maleic acid may be prepared, for example, by a two-step process in which an alkyl alcohol and maleic anhydride are mixed (optionally heated to speed the reaction) to form a half ester in the first step. In the second step, the reaction of an epoxide, e.g. ethylene oxide, propylene oxide and styrene oxide, with the half ester (thus formed in the first step) produces a mixed ester useful in the practice of this invention. Halogen-containing β-hydroxyalkyl esters may be prepared, for example, by the reaction of an α,β-ethylenically unsaturated acid as defined above, e.g. acrylic acid, with an epihalohydrin such as epichlorohydrin. Epihalohydrins also may be used in the two-step procedure referred to above for preparation of mixed esters from an anhydride such as maleic anhydride to produce β-hydroxyalkyl esters having halogen substitutents.

The copolymers of this invention are prepared from mixtures of ethylene and the above-described β-hydroxyalkyl esters of α,β-ethylenically unsaturated acids by polymerization either in tubular or stirred autoclave reactors at pressures from about 10,000 to about 35,000 pounds per square or higher, at temperatures from about 130° C. to about 300° C., preferably from about 150° C. to about 260° C. using, at catalytically effective concentration, polymerization catalysts such as peroxygen-type catalysts or other free-radical producing materials such as the azo catalysts or others well known in the art. Examples of the peroxygen-type catalysts are diethyl peroxide, hydrogen peroxide, di-tertiary butyl peroxide, persuccinic acid, lauroyl peroxide, tetrahydronaphthalene peroxide, alkali metal, alkaline earth metal or ammonium persulfates, perborates, percarbonates, and the like. Such catalysts usually are used in the range from about 0.01 percent to about 1 percent, based on the weight of the monomers. Other methods of catalysis; such as irradiation by ultraviolet, X-ray and gamma rays as well as by radiation from radioactive materials and high energy electrons generated from linear accelerators, resonant transformers, and the like; may be used if desired. The term "under the influence of free-radical producing means" is defined to include free-radical producing materials as defined above in contact (e.g., either as solid particles or in solution) with the polymerizable monomer mixture and to irradiation as herein described, which produce free-radicals in effective concentration within the polymerization zone.

The upper limit of pressure is determined by the mechanical strength of the reactor and the pumps. Higher pressure effects higher molecular weights and higher conversions. The polymerization is carried out either in the presence or absence of water and/or inert solvents. The ethylene copolymers of this invention desirably contain from about 1 to about 35 percent of a $\beta$-hydroxyalkyl ester of an $\alpha,\beta$-ethylenically unsaturated carboxylic acid based on the total copolymer weight. The balance of the copolymer composition, i.e., from about 65 percent to about 99 percent, usually is ethylene. However, if desired, there may be substituted for a portion of the ethylene minor proportions, i.e. up to about 2 percent, of other polymerizable ethylenically unsaturated alpha-olefins. Similarly, if desired, there may be included small amounts, i.e. up to about 10 percent by weight, of other polymerizable ethylenically unsaturated monomers, not described above, such as the alkenyl-aromatic compounds (the styrene compounds); alkyl acrylates, such as ethyl acrylate, n-butyl acrylate, and 2-ethylhexyl acrylate; alkyl methacrylates; acrylic nitriles; methacrylic nitriles; maleic esters such as diethyl maleate; fumaric esters; unsaturated alcohol esters such as vinyl acetate; unsaturated ketones such as methyl isopropenyl ketone; and the like. Also, chain transfer agents having no ethylenic unsaturation, such as acetone, methanol, propanol, and the like, may be used in minor amounts if desired.

Likewise, small amounts of conventional additives and modifiers useful in the plastics art, such as antioxidants, stabilizers, antistatic agents, antiblocking agents, slip agents, carbon black, pigments, colorants, and the like, can be blended with the copolymers of this invention.

The following examples illustrate more fully, to those skilled in the art, the practice of this invention but are not to be construed as limiting the scope thereof. In these examples, all parts and percentages are by weight unless otherwise indicated.

EXAMPLE 1

Etheylene at the rate of 23 pounds per hour, $\beta$-hydroxyethyl acrylate at the rate of 1.0 pounds per hour, and a catalyst, lauroyl peroxide, at the rate of 0.035 pounds per hour (as a 15 percent solution in a mixed solvent consisting of equal quantities by volume of benzene and hexane) were introduced into a stirred autoclave reactor. The temperature was maintained at 210° C. and the pressure at 21,000 pounds per square inch. A white solid product which contained 22.0 percent by weight of polymerized $\beta$-hydroxyethyl acrylate was isolated from the reaction mixture. This product had the following properties as determined by standard methods defined hereinafter.

| | |
|---|---|
| Melt index | 20 |
| Tensile strength _____p.s.i__ | 540 |
| Elongation _____percent__ | 405 |
| Density | 0.9880 |
| Rigidity _____p.s.i__ | $0.3 \times 10^4$ |

EXAMPLES 2–8

Other copolymers were prepared in the same equipment and by a similar procedure to that described in Example 1. The changes in polymerization conditions, including feed composition and feed rates, are shown in Table I as well as the properties of the copolymer products obtained thereby.

*Table I*

| Polymerization | Example No. | | | | | | |
|---|---|---|---|---|---|---|---|
| | 2 | 3 | 4 | 5 | 6 | 7 | 8 |
| Temperature, ° C | 207 | 204 | 205 | 206 | 215 | 210 | 210 |
| Pressure, ($\times 10^{-3}$) p.s.i | 21 | 16 | 16 | 16 | 21 | 21 | 21 |
| Ethylene feed rate, lb./hr | 26 | 23 | 23 | 25 | 36.3 | 37.6 | 37.7 |
| $\beta$-Hydroxyalkyl ester used (a) | BHEA | BHEA | BHEMA | BHEMA | BHPA | BHPA | {BHPA / BHEA |
| $\beta$-Hydroxyalkyl ester feed rate, lb./hr | 1.1 | 1.0 | .243 | .225 | .1265 | .788 | c.405 |
| Catalyst feed rate, ($\times 10^3$) lb./hr | 9.3 | 125 | 13 | 22.5 | 8.4 | 5 | 5 |
| Product properties: | | | | | | | |
| $\beta$-Hydroxyalkyl ester in product, percent | 17 | 12 | 6.2 | 22 | 24.6 | 14.7 | 16.7 |
| Melt Index | 1.64 | 0.54 | 28.3 | 1,000 | 96.6 | 2.66 | 7.8 |
| Tensile Strength, p.s.i | 800 | 850 | 1,350 | 680 | 1,165 | 1,690 | 1,685 |
| Yield Strength, p.s.i | (b) | (b) | 1,240 | 730 | 580 | 1,090 | 965 |
| Elongation, percent | 395 | 99 | 470 | 135 | 660 | 550 | 600 |
| Rigidity ($\times 10^{-3}$), p.s.i | (b) | (b) | (b) | (b) | 5.0 | 9.8 | 8.4 |
| Density | .9740 | .9639 | (b) | (b) | .9564 | (b) | (b) | a BHEA $\beta$-hydroxyethyl acrylate.
  BHEMA $\beta$-hydroxyethyl methacrylate.
  BHPA $\beta$-hydroxypropyl acrylate.
b Not determined.
c Each.

EXAMPLE 9

Ethylene at the rate of 44 pounds per hour, di($\beta$-hydroxypropyl) maleate at the rate of 1.1 pounds per hour, and a catalyst, $\alpha,\alpha'$-azo-bis-isobutyronitrile, at the rate of .0062 pound per hour (as a 10 percent solution in benzene) were introduced into a stirred autoclave reactor. The temperature was maintained at 210° C. and the pressure at 21,000 pounds per square inch. A white solid product containing 24 percent by weight of polymerized di($\beta$-hydroxypropyl) maleate was isolated from the reaction mixture. The copolymer product had the following properties as determined by standard methods defined hereinafter.

| | |
|---|---|
| Melt index | 2 |
| Tensile strength _____p.s.i.. | 1060 |
| Yield strength _____p.s.i.. | 945 |
| Elongation _____percent.. | 460 |
| Rigidity _____p.s.i.. | $7.8 \times 10^3$ |
| Density | .9717 |

The di($\beta$-hydroxypropyl) maleate used in the above example was a portion of the product obtained by reacting 1 mole of propylene glycol and 1 mole of propylene oxide with 1 mole of maleic anhydride in a two-step process. In the first step, a half ester was formed from the maleic anhydride and the propylene glycol. In the second step, di($\beta$-hydroxypropyl) maleate was produced by the reaction of propylene oxide with the product, i.e. the half ester, of the first step.

EXAMPLE 10

Another copolymer of ethylene with di($\beta$-hydroxypropyl) maleate was prepared by the method of Example 9 except for the following changes in conditions:

| | |
|---|---|
| Reactor temperature, °C | 215 |
| Catalyst feed rate _____lb./hr.. | .0075 |
| Ethylene feed rate _____lb./hr.. | 45.5 |
| Di($\beta$-hydroxypropyl) maleate feed rate__lb./hr.. | 0.56 |

The product obtained thereby contained 5.2 percent by weight of polymerized di($\beta$-hydroxypropyl) maleate. The properties of the product were as follows:

| | |
|---|---|
| Melt index | 0.52 |
| Tensile strength _____p.s.i.. | 1435 |
| Yield strength _____p.s.i.. | 1385 |
| Elongation _____percent.. | 400 |
| Rigidity _____p.s.i.. | $16 \times 10^3$ |
| Density | .9292 |

As one test of the thermosettable nature of the ethylene copolymers of this invention, the tensile strength of the product of Example 7 was tested and compared before and after curing with a copolymer of ethylene with ethyl acrylate, not a product of this invention, in which the ethyl acrylate component represented 20 percent of the total copolymer weight. In order to test the tensile strength of these materials under uniform conditions, molded samples were prepared by subjecting the materials for five minutes in a molding press to a specified temperature which was the curing temperature to be used. These samples were then tested for tensile strength in the manner hereinafter described and the results were considered as the base point for the comparison although some curing could take place during the preparation of the molded sample. Other samples of the materials were heated at the same temperature for two hours in a molding press and then were tested in the same manner for tensile strength. The results are shown in Table II.

Table II

ETHYLENE COPOLYMERS

[Tensile Strength (p.s.i.)]

| Comonomer | Uncured Sample Molded at Temperature of | | Cured 2 hours at Temperature of | |
|---|---|---|---|---|
| | 290° F. | 500° F. | 290° F. | 500° F. |
| $\beta$-hydroxypropyl acrylate | 1,690 | 1,940 | 1,775 | 2,320 |
| Ethyl acrylate [1] | 1,735 | 1,915 | 1,940 | 2,015 |

[1] Not an example of this invention.

In a comparison of the effect of increasing the curing temperature from 290° F. to 500° F. for two hours it is noted that the product of this invention has a tensile strength 545 p.s.i. higher at 500° F. than at 290° F. (2320 p.s.i. vs. 1775 p.s.i.) whereas the tensile strength of the ethyl acrylate copolymer increases only 75 p.s.i. (2015) p.s.i. vs. 1940 p.s.i.) with the same change in curing temperature—a very substantial difference. Similarly a comparison of the increase in tensile strength of the copolymers cured for 2 hours at 500° F. with the tensile strength of the same copolymers in which the samples for testing were prepared under conditions selected to minimize curing during preparation of the sample, i.e. molded at 290° F. for 5 minutes, shows that the tensile strength in the product of this invention increases 630 p.s.i. (1690 p.s.i. to 2320 p.s.i.) whereas the tensile strength of ethyl acrylate copolymers increases only 280 p.s.i. (1735 p.s.i. to 2015 p.s.i.).

Other tests confirmed the thermosettable nature of the products of this invention. For example, modified melt indexes, as defined hereinabove, were determined and compared at temperatures ranging from 190° C. to 300° C. at various residence times (i.e. the amount of time the material was in the melt indexer at the particular temperature before beginning the measurement) ranging from 2 min. to 30 min. for various ethylene copolymers with $\beta$-hydroxyalkyl esters in various concentrations from about 10 percent to 30 percent by weight, based on the total copolymer weight. Representative illustrative results are shown in Table III. Modified melt index values are shown also in Table III for known polymers, not products of this invention, i.e., polyethylene and copolymers of ethylene with ethyl acrylate.

Table III

MODIFIED MELT INDEXES

| Comonomer | | Residence Time, Min. | Index Values at Temperature indicated (° C.) | | | | | | |
|---|---|---|---|---|---|---|---|---|---|
| Kind | Amount, Percent by weight | | 190 | 200 | 220 | 240 | 250 | 280 | 300 |
| $\beta$-hydroxyethyl acrylate | 9.8 | 5 | 2.3 | | | | | 15 | |
| | 9.8 | 10 | 2.2 | | 4.6 | | | | |
| | 9.8 | 15 | 2.0 | | 2.9 | | | 1.1 | |
| | 9.8 | 20 | 1.9 | | 2.2 | | | 0.28 | |
| | 9.8 | 30 | 1.1 | | 0.9 | | | | |
| | 30.0 | 2 | 14 | | | | | | |
| | 30.0 | 6 | 0.13 | | | | | | |
| $\beta$-hydroxy propyl acrylate | 14.6 | 4 | | | 4.5 | | | | 12 |
| | 14.6 | 10 | | | 4.3 | 7.0 | 8.9 | 7.0 | .02 |
| | 14.6 | 15 | | | | | | 3.7 | .03 |
| | 14.6 | 30 | | | 3.6 | 2.8 | 0.74 | .09 | |
| Ethyl acrylate [1] | 8.5 | 5 | | | | | | | |
| | 19.6 | 5 | | { 3.3 | 5.3 | | | 21 | 33 |
| | | | | { 2.8 | 4.8 | 7.7 | | 21 | 34 |
| None (i.e. polyethylene) [1] | | 5 | 1.9 | 2.6 | 4.5 | 8.0 | 11 | 20 | |
| | | 10 | 2.35 | | 5.3 | 8.6 | | | |
| | | 30 | 2.5 | | 5.7 | 9.2 | | | |

[1] Not an example of this invention.

Analysis of the results shows that the modified melt indexes of the products of this invention vary inversely with time, temperature, and concentration of the hydroxyl-containing component. In comparison and contrast therewith, modified melt indexes of polymers not products of this invention, e.g. polyethylene and ethylene copolymers such as with ethyl acrylate, show a linear variation of log melt index vs. log melt index temperature and only slight influence of monomer concentration.

Thus it can be seen that the products of this invention can be prepared in a form so that they are easily processible (as indicated by their melt index) yet can be cured to much tougher materials having less deformation at higher temperatures and having greater tensile strength, simply by the application of heat. Thus, with thermoplastic polymers to get high tensile strength, for example, it is necessary to sacrifice processibility; with the thermosetting copolymers of this invention it is possible to obtain processability in the initial polymer then to increase the tensile strength by the application of heat.

The methods used to evaluate the properties of the polymer products and of the films obtained therefrom were as follows:

*Melt index.*—The melt index was determined by the method of ASTM D1238–52T.

*Density.*—The density, more precisely called specific garvity, was determined by the method of ASTM D792–50, modified for a liquid temperature of 25±0.2° C. rather than 23±0.1° C.

*Tensile strength.*—The tensile strength was determined according to the method of ASTM D638–58T modified to the extent that the results are calculated on the average of 4 specimens of a thickness of 140±10 mils and the specimens were conditioned by (1) submerging the specimens in boiling distilled water for 10 minutes, (2) keeping them in air at 50±5% relative humidity at 73.4±1° F. for at least 15 minutes. Such specimens were prepared by molding.

*Yield strength.*—The yield strength was determined from specimens prepared as for the Tensile Strength Test and is defined as the tension (in lb.) at the yield point (as described in item 24 of the Appendix of D638–58T) per square inch of cross-sectional area of the specimen.

*Percentage elongation.* — Percentage elongation (at break) was determined as a percentage of the original gauge length from specimens conditioned as described above.

*Rigidity.*—Rigidity, or stiffness in flexure, was determined by the method of ASTM D747–58T.

*β-Hydroxyalkyl ester in the product.*—The β-hydroxyalkyl ester (expressed as percent by weight) which was polymerized in the product was determined by infrared analysis using standards based upon direct oxygen analysis by the volumetric method substantially as described in Al Steyermark, "Quantitative Organic Microanalysis," Academic Press, New York, 2nd Edition, 1961, pages 396–404. The ethyl acrylate copolymer compositions were determined in the same manner.

The compositions of this invention provide advantageous self-supporting films and fabricated articles such as pipe and containers.

What is claimed is:

1. A thermosettable copolymer of free-radical polymerized monomers consisting essentially of from about 65 percent to about 99 percent by weight of ethylene and from about 1 percent to about 35 percent by weight of a β-hydroxyalkyl ester selected from the group consisting of β-hydroxyethyl acrylate and β-hydroxyethyl methacrylate.

2. The thermosettable copolymer of claim 1 wherein the β-hydroxyalkyl ester is β-hydroxyethyl acrylate.

3. The thermosettable copolymer of claim 1 wherein the β-hydroxyalkyl ester is β-hydroxyethyl methacrylate.

4. A process for producing a thermosettable copolymer comprising heating at a temperature of from 130° C. to about 300° C. under a pressure from about 10,000 to about 35,000 pounds per square inch and under the influence of free-radical producing means a monomer mixture consisting essentially of
   (a) ethylene
   (b) a β-hydroxyalkyl ester selected from the group consisting of β-hydroxyethyl acrylate and β-hydroxyethyl methacrylate.

5. The process of claim 4 in which the monomer mixture consists essentially of from about 65 percent to about 99 percent by weight of ethylene and from about 1 percent to about 35 percent by weight, of a β-hydroxyalkyl ester based on the total weight of the monomer mixture.

6. The process of claim 4 in which the β-hydroxyalkyl ester is β-hydroxyethyl acrylate.

7. The process of claim 4 in which the β-hydroxyalkyl ester is β-hydroxyethyl methacrylate.

References Cited by the Examiner

UNITED STATES PATENTS

| | | | |
|---|---|---|---|
| 2,681,897 | 6/1954 | Frazier et al. | 260—78.5 |
| 3,002,959 | 10/1961 | Hicks | 260—88.1 |
| 3,159,610 | 12/1964 | Slocombe et al. | 260—87.5 |

JOSEPH L. SCHOFER, *Primary Examiner.*

L. WOLF, L. G. CHILDERS, *Assistant Examiners.*